Dec. 19, 1950  R. A. HAGEN  2,534,816
BARREL BEDDING BROACH
Filed March 27, 1947
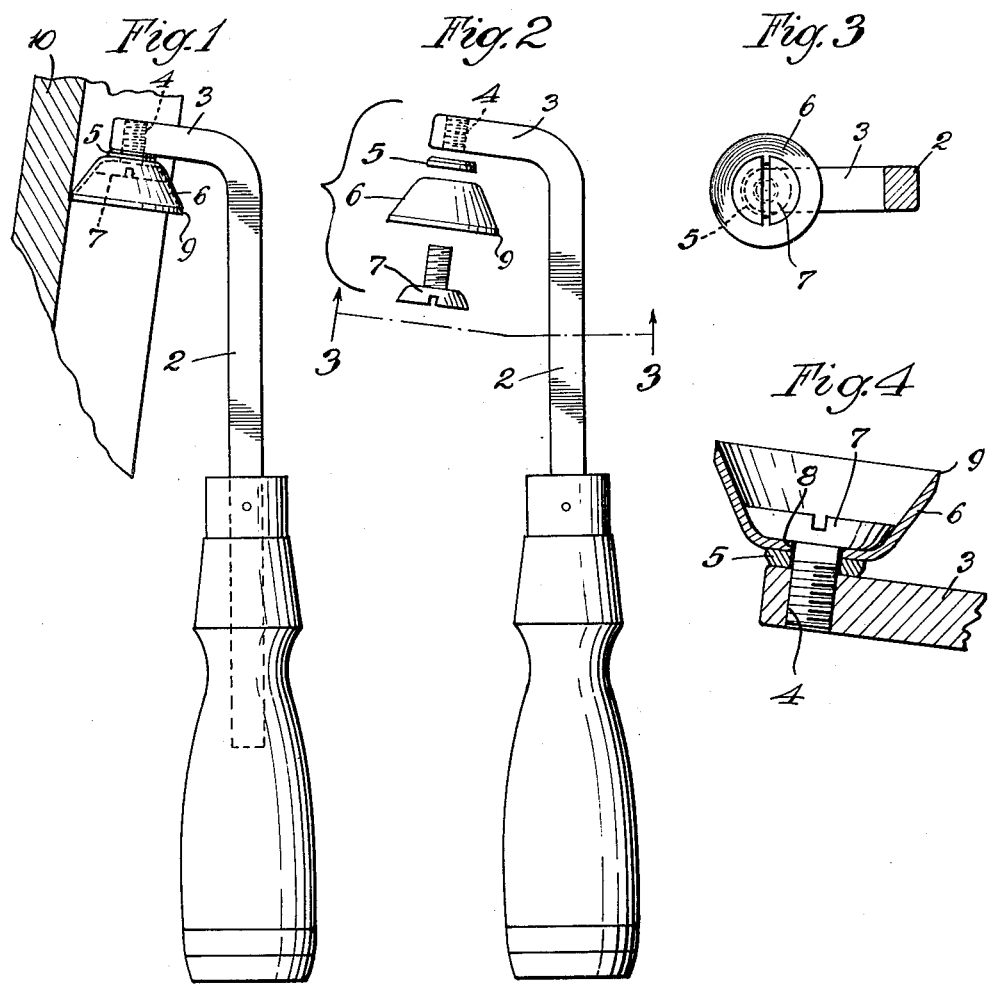
Inventor
Rudolf A. Hagen
by Parker & Carter
Attorneys Patented Dec. 19, 1950

2,534,816

UNITED STATES PATENT OFFICE 2,534,816

BARREL BEDDING BROACH

Rudolf A. Hagen, Chicago, Ill.

Application March 27, 1947, Serial No. 737,622

2 Claims. (Cl. 30—314)

My invention relates to improvements in chisels and the like, and has for one object to provide a new and improved form of inletting chisel which may be used especially in connection with gun stock manufacturing, door inletting, furniture manufacturing and the like.

Another object is to provide a new and improved form of round-nosed chisel or gouge wherein the cutting element may be used with the sharp edge directed toward or away from the user interchangeably.

Another object is to provide a form of gouge or chisel wherein a cutting element is cheap, compact and may be discarded and replacements used, just as are safety razor blades.

Another object of my invention is to provide a gouge or chisel wherein, as the working edge becomes dull, a very slight rotation of the cutting cup may be made to present a new portion of a sharp edge for the work, thereby minimizing the frequency with which work must be stopped to sharpen or change the cutting tool.

Other objects will appear from time to time in the specification and claims.

My invention is illustrated more or less diagrammatically in the accompanying drawing, wherein:

Figure 1 is a side elevation of tool and work;

Figure 2 is an exploded view of the tool;

Figure 3 is a section along the line 3—3 of Figure 2; and

Figure 4 is a transverse section of the tool.

Like parts are indicated by like characters in the specification and drawings.

1 is a wooden handle. 2 is a metallic shank extending from the handle, having a gooseneck 3 inclined to the shank away from the handle. The gooseneck terminates in a threaded aperture 4. 5 is a washer, 6 a cutting cup, and 7 a holding screw, the latter passing through the aperture 8 in the cup, through the washer, and being threaded in the threaded aperture at the end of the gooseneck. The screw has a flat head which fits and partially fills the inside of the cup. The cup is sharpened by grinding the outside peripheral edge thereof as indicated at 9. 10 indicates a gun stock, the gouge or chisel being used to cut away the interior thereof for the purpose of inletting the gun action.

The use and operation of my invention are as follows:

The gouge may be used either to cut toward the operator when the parts are assembled as in the drawings, or, if desired, the screw may be unscrewed, the washer and cup placed at the other end of the gooseneck, and the cut may be away from the user. As the tool becomes dull with use, all the operator has to do is to insert a screw driver in the slot of the screw, release the tension, and slightly rotate the cup, thus presenting a new, sharp, unused part of the cutting edge to the work. This may continue until the entire edge has become dull, when the cup may be thrown away and replaced by a new cup, or the cup may be sharpened on a stone just as round-nosed chisels or gouges are usually sharpened.

The gooseneck being slightly inclined away from the user makes it possible for the handle to be enough above the work to provide clearance even though the axis of the cup is parallel with the work. The presence of the screw partially filling the cup, with its face perpendicular to the axis of the cup, insures that as the chip comes in beyond the cutting edge it will be guided upwardly and outwardly and tend to roll, thereby avoiding chip interference.

Because the screw seats at the sides, that is— at its outer periphery against the wall of the cup, a close contact is maintained between the screw and the cup and as a result there is no possibility of chips being caught between the screw and the cup, the chips are guided along the cup to the screw face and discharged by the cup with the face or end of the screw.

I claim:

1. A barrel bedding broach comprising a shank, an offset member extending laterally from the end thereof and making an obtuse angle with the shank, a cup-shaped cutting tool in the form of a truncated cone having a bottom wall and an outwardly flared circumferential side wall, said circumferential side wall being sharpened along the periphery of its outer edge to provide a cutting edge and a cylindrical surface substantially parallel with the axis of said cone, said bottom wall being centrally apertured, a holding screw extending through said aperture, said screw having a head portion in engagement with said bottom wall and with the entire inner peripheral portion of said side wall adjacent said bottom wall and entirely filling that part of the cup in which it is located, said screw head having a surface generally perpendicular to the axis of the cone, the end of the offset member being apertured and threaded to permit penetration by the screw to hold the cup interchangeably on opposed faces of the offset member.

2. A barrel bedding broach comprising a shank, an offset member extending laterally from the end thereof and making an obtuse angle with the shank, a cup-shaped cutting tool in the form of a truncated cone having a bottom wall and an outwardly flared circumferential side wall, said circumferential side wall being sharpened along the periphery of its outer edge to provide a cutting edge and a cylindrical surface substantially parallel with the axis of said cone, said bottom wall being centrally apertured, a holding screw extending through said aperture, said screw having a head portion in engagement with said bottom wall and with the entire inner peripheral portion of said side wall adjacent said bottom wall and entirely filling that part of the cup in which it is located, said screw head having a surface generally perpendicular to the axis of the cone, the end of the offset member being apertured and threaded to permit penetration by the screw to hold the cup interchangeably on opposed faces of the extension, a cushion washer encircling the screw, the outer diameter of which is greater than the width of the offset member, the washer being located between the extension and the base of the cup and reinforcing the cup.

RUDOLF A. HAGEN.

REFERENCES CITED

The following references are of record in the file of this patent:

UNITED STATES PATENTS

| Number | Name | Date |
| --- | --- | --- |
| 245,170 | Hull | Aug. 2, 1881 |
| 637,463 | Hegarty | Nov. 21, 1899 |
| 2,318,585 | Abrahamsen | May 11, 1943 |